(12) United States Patent
Yang et al.

(10) Patent No.: US 12,400,296 B2
(45) Date of Patent: Aug. 26, 2025

(54) IMAGE SUPER-RESOLUTION

(71) Applicant: Microsoft Technology Licensing, LLC, Redmond, WA (US)

(72) Inventors: Huan Yang, Redmond, WA (US); Jianlong Fu, Beijing (CN); Baining Guo, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 354 days.

(21) Appl. No.: 17/919,723

(22) PCT Filed: Apr. 20, 2021

(86) PCT No.: PCT/US2021/028050
§ 371 (c)(1),
(2) Date: Oct. 18, 2022

(87) PCT Pub. No.: WO2021/231042
PCT Pub. Date: Nov. 18, 2021

(65) Prior Publication Data
US 2023/0177643 A1 Jun. 8, 2023

(30) Foreign Application Priority Data
May 15, 2020 (CN) .......................... 202010414770.6

(51) Int. Cl.
G06T 3/4053 (2024.01)
G06T 3/4046 (2024.01)
G06T 7/40 (2017.01)

(52) U.S. Cl.
CPC .......... *G06T 3/4053* (2013.01); *G06T 3/4046* (2013.01); *G06T 7/40* (2013.01);
(Continued)

(58) Field of Classification Search
None
See application file for complete search history.

(56) References Cited

U.S. PATENT DOCUMENTS 10,311,337 B1 * 6/2019 Kim ...................... G06F 18/217
10,424,087 B2 9/2019 Risser
(Continued)

FOREIGN PATENT DOCUMENTS

CN 106204449 A 12/2016
CN 107154023 A 9/2017
(Continued)

OTHER PUBLICATIONS

First Office Action Received for Chinese Application No. 202010414770.6, mailed on Jun. 24, 2024, 10 pages. (English Translation Provided).
(Continued)

*Primary Examiner* — Jiangeng Sun
(74) *Attorney, Agent, or Firm* — Schwegman Lundberg & Woessner, P.A.

(57) ABSTRACT

There is provided a solution for image processing. In this solution, first and second information is determined based on texture features of an input image and a reference image. The first information at least indicates for a first pixel block in the input image a second pixel block in the reference image most relevant to the first pixel block in terms of the texture features, and the second information at least indicates a relevance of the first pixel block to the second pixel block. A transferred feature map with a target resolution is determined based on the first information and the reference image. The input image is transformed into an output image with the target resolution based on the transferred feature map and the second information. The output image reflects a texture feature of the reference image.

13 Claims, 5 Drawing Sheets

(52) U.S. Cl.
CPC .............. *G06T 2207/20021* (2013.01); *G06T 2207/20081* (2013.01); *G06T 2207/20084* (2013.01)

(56) References Cited

U.S. PATENT DOCUMENTS

| | | | | |
|---|---|---|---|---|
| 2019/0370936 | A1* | 12/2019 | Zhang | ........................ G06T 3/40 |
| 2019/0378242 | A1* | 12/2019 | Zhang | ....................... G06F 18/22 |

FOREIGN PATENT DOCUMENTS

| | | | | |
|---|---|---|---|---|
| CN | 107464217 | A | | 12/2017 |
| CN | 109961396 | A | * | 7/2019 ........... G06N 3/0454 |
| CN | 110033003 | A | | 7/2019 |

OTHER PUBLICATIONS

Almasri, et al., "Multimodal Sensor Fusion in Single Thermal image Super-Resolution", In Asian Conference on Computer Vision, Dec. 2, 2018, 16 Pages.

Boominathan, "Improving Resolution and Depth-of-Field of Light Field Cameras using a Hybrid Imaging System", In Proceedings of IEEE International Conference on Computational Photography, May 2, 2014, 10 Pages.

Chang, et al., "Superresolution Through Neighbor Embedding", In Proceedings of the IEEE Computer Society Conference on Computer Vision and Pattern Recognition, Jun. 27, 2004, 8 Pages.

Dai, et al., "Second-Order Attention Network for Single Image Super-Resolution", In Proceedings of IEEE/CVF Conference on Computer Vision and Pattern Recognition, Jun. 15, 2019, pp. 11057-11066.

Dong, et al., "Accelerating the Super-Resolution Convolutional Neural Network", In Proceedings of 14th European Conference on Computer Vision, Oct. 11, 2016, 17 Pages.

Dong, et al., "Image Super-Resolution Using Deep Convolutional Networks", In the Journal of IEEE transactions on Pattern Analysis and Machine Intelligence, vol. 38, Issue 2, Jun. 1, 2015, 14 Pages.

Freedman, et al., "Image and Video Upscaling from Local Self-Examples", In Journal of ACM Transactions on Graphics, vol. 30, Issue 2, Apr. 22, 2011, 11 Pages.

Freeman, "Example-Based Super-Resolution", In Journal of IEEE Computer Graphics and Applications, vol. 22, Issue 2, Mar. 2002, pp. 56-65.

Gondal, et al., "The Unreasonable Effectiveness of Texture Transfer for Single Image Super-resolution", In Repository of arXiv:1808.00043, Jul. 31, 2018, 19 Pages.

Goodfellow, et al., "Generative Adversarial Nets", In Proceedings of the 27th International Conference on Neural Information Processing Systems, Dec. 8, 2014, 9 Pages.

Gulrajani, "Improved Training of Wasserstein GANS", In Journal of Advances in Neural Information Processing Systems, Dec. 25, 2017, 20 Pages.

He, et al., "Deep Residual Learning for Image Recognition", In Proceedings of the IEEE Conference on Computer Vision and Pattern Recognition, Jun. 27, 2016, pp. 770-778.

Huang, et al., "Densely Connected Convolutional Networks", In Proceedings of the IEEE Conference on Computer Vision and Pattern Recognition, Jul. 21, 2017, pp. 2261-2269.

Huang, et al., "Single Image Super-Resolution from Transformed Self-Exemplars", In Proceedings of IEEE Conference on Computer Vision and Pattern Recognition, Jun. 7, 2015, pp. 5197-5206.

Jiang, et al., "A Very Deep Spatial Transformer Towards Robust Single Image Super-Resolution", In Journal of IEEE Access, vol. 7, Apr. 2, 2019, pp. 45618-45631.

Johnson, et al., "Perceptual Losses for Real-Time Style Transfer and Super-Resolution", In Journal of Computing Research Repository, Mar. 27, 2016, 18 Pages.

Kim, et al., "Accurate Image Super-Resolution Using Very Deep Convolutional Networks", In Proceedings of the IEEE Conference on Computer Vision and Pattern Recognition, Nov. 11, 2016, 9 Pages.

Kim, et al., "Deeply-Recursive Convolutional Network for Image Super-Resolution", In Proceedings of IEEE Conference on Computer Vision and Pattern Recognition, Jun. 27, 2016, pp. 1637-1645.

Ledig, et al., "Photo-Realistic Single Image Super-Resolution Using a Generative Adversarial Network", In Proceedings of IEEE Conference on Computer Vision and Pattern Recognition, Jul. 21, 2017, pp. 105-114.

Lim, et al., "Enhanced Deep Residual Networks for Single Image Super-Resolution", In Proceedings of the IEEE Conference on Computer Vision and Pattern Recognition Workshops, Jul. 21, 2017, pp. 1132-1140.

Liu, et al., "Retrieval Compensated Group Structured Sparsity for Image Super-Resolution", In Journal of IEEE Transactions on Multimedia, vol. 19, Issue 2, Feb. 2017, pp. 302-316.

Matsui, et al., "Sketch-Based Manga Retrieval Using Manga109 Dataset", In Journal of Multimedia Tools and Applications, vol. 76, Issue 20, Oct. 1, 2017, 21811-21838.

Oktay, et al., "Multi-Input Cardiac Image Super-Resolution Using Convolutional Neural Networks", In Proceedings of International Conference on Medical Image Computing and Computer-Assisted Intervention, Oct. 17, 2016, pp. 246-254.

"International Search Report and Written Opinion Issued in PCT Application No. PCT/US21/028050", Mailed Date: Jul. 15, 2021, 11 Pages.

Rasti, et al., "Convolutional Neural Network Super Resolution for Face Recognition in Surveillance Monitoring", In Proceedings of IEEE Conference on Computer Vision and Pattern Recognition Workshops, Jul. 21, 2017, pp. 175-184.

Sajjadi, et al., "EnhanceNet: Single Image Super-Resolution Through Automated Texture Synthesis", In Proceedings of IEEE International Conference on Computer Vision, Oct. 22, 2017, pp. 4501-4510.

Shi, et al., "Cardiac Image Super-Resolution with Global Correspondence Using Multi-Atlas Patchmatch", In International Conference on Medical Image Computing and Computer-Assisted Intervention, Sep. 22, 2013, pp. 9-16.

Shi, et al., "Real-Time Single Image and Video Super-Resolution Using an Efficient Sub-Pixel Convolutional Neural Network", In Proceedings of the IEEE Conference on Computer Vision and Pattern Recognition, Jun. 27, 2016, pp. 1874-1883.

Simonyan, et al., "Very Deep Convolutional Networks for Large-Scale Image Recognition", In Journal of the Computing Research Repository, Sep. 4, 2014, 14 pages.

Sun, et al., "High-Resolution Representations for Labelling Pixels and Regions", In Journal of Computing Research Repository, Apr. 9, 2019, 13 Pages.

Sun, "Super-Resolution from Internet Scale Scene Matching", In Proceedings of IEEE International Conference on Computational Photography, Apr. 28, 2012, 12 Pages.

Tai, et al., "Image Super-Resolution via Deep Recursive Residual Network", In Proceedings of IEEE Conference on Computer Vision and Pattern Recognition, Jul. 21, 2017, pp. 2790-2798.

Tai, et al., "Memnet: A Persistent Memory Network for Image Restoration", In Proceedings of IEEE International Conference on Computer Vision, Oct. 22, 2017, 9 Pages.

Timofte, et al., "Anchored Neighborhood Regression for Fast Example-Based Super-Resolution", In Proceedings of IEEE International Conference on Computer Vision, Dec. 1, 2013, pp. 1920-1927.

Tong, et al., "Image Super-Resolution Using Dense Skip Connections", In Proceedings of the IEEE international Conference on Computer Vision, Oct. 22, 2017, pp. 4809-4817.

Vaswani, et al., "Attention Is All You Need", In Proceedings of Advances in Neural Information Processing Systems, Dec. 4, 2017, 11 Pages.

Wang, "Esrgan: Enhanced Super-Resolution Generative Adversarial Networks", In Proceedings of Workshops in Computer Vision, Sep. 8, 2018, 23 Pages.

(56) References Cited

OTHER PUBLICATIONS

Wang, et al., "The Light Field Attachment: Turning a DSLR into a Light Field Camera Using a Low Budget Camera Ring", In Journal of IEEE Transactions on Visualization and Computer Graphics vol. 23, Issue 10, Oct. 1, 2017, pp. 2357-2364.

Yildirim, "A Novel Image Fusion Method using IKONOS Satellite Images", In Journal of Geodesy and Geoinformation, May 2012, pp. 27-34.

Yue, et al., "Landmark Image Super-Resolution by Retrieving Web Images", In Journal of IEEE Transactions on Image Processing, vol. 22, Issue 12, Dec. 2013, pp. 4865-4878.

Zhang, et al., "Image Super-Resolution by Neural Texture Transfer", In Proceedings of IEEE/CVF Conference on Computer Vision and Pattern Recognition, Jun. 15, 2019, pp. 7974-7983.

Zhang, et al., "Image Super-Resolution using Very Deep Residual Channel Attention Networks", In Proceedings of the European Conference on Computer Vision, Sep. 8, 2018, pp. 1-16.

Zhang, et al., "Learning a Single Convolutional Super-Resolution Network for Multiple Degradations", In Proceedings of the IEEE Conference on Computer Vision and Pattern Recognition, Jun. 18, 2018, 10 Pages.

Zhang, et al., "RankSRGAN: Generative Adversarial Networks with Ranker for Image Super-Resolution", In Proceedings of IEEE/CVF International Conference on Computer Vision, Oct. 27, 2019, pp. 3096-3105.

Zhang, et al., "Reference-Conditioned Super-Resolution by Neural Texture Transfer", In Journal of Computing Research Repository, Apr. 10, 2018, 16 Pages.

Zhang, et al., "Residual Dense Network for Image Super-Resolution", In Proceedings of IEEE/CVF Conference on Computer Vision and Pattern, Jun. 18, 2018, pp. 2472-2481.

Zheng, et al., "CrossNet: An End-to-End Reference-based Super Resolution Network using Cross-scale Warping", In Proceedings of the European Conference on Computer Vision, Sep. 8, 2018, 17 Pages.

Zheng, "Learning Cross-Scale Correspondence and Patch-Based Synthesis for Reference-Based Super-Resolution", In Journal of British Machine Vision Conference, Sep. 4, 2017, 13 Pages.

Zou, et al., "Very Low Resolution Face Recognition Problem", In Journal of IEEE Transactions on image processing, vol. 20, Issue 1, Jul. 18, 2011, 8 Pages.

Yang, et al., "Learning Texture Transformer Network for Image Super-Resolution", In Proceedings of IEEE/CVF Conference on Computer Vision and Pattern Recognition, Jun. 13, 2020, pp. 5790-5799.

Second Office Action Received for Chinese Application No. 202010414770.6, mailed on Feb. 8, 2025, 09 pages. (English Translation Provided).

Communication under Rule 71(3) EPC Received for European Application No. 21724119.9, mailed on Apr. 10, 2025, 07 pages.

Notice of Allowance Received for Chinese Application No. 202010414770.6, mailed on May 7, 2025, 08 pages. (English Translation Provided).

* cited by examiner

IMAGE SUPER-RESOLUTION

CROSS-REFERENCE TO RELATED APPLICATION

This application is a U.S. National Stage Filing under 35 U.S.C. 371 of International Patent Application Serial No. PCT/US2021/028050, filed Apr. 20, 2021, and published as WO 2021/231042 A1 on Nov. 18, 2021, which application claims the benefit of priority to Chinese Patent Application No. 202010414770.6, filed May 15, 2020, which applications and publication are incorporated herein by reference in their entirety.

BACKGROUND

In the field of image processing, it is a common requirement to convert the resolution of an image. Image Super-resolution (SR) refers to an image processing process of generating high-resolution images with natural and clear textures based on low-resolution images. Image super-resolution is a very important issue in the field of image enhancement. In recent years, thanks to the powerful learning ability of deep learning technology, this problem has been significantly developed. Image super-resolution technology is widely used in various fields, such as digital zoom in digital camera photography, and material enhancement (for example, texture material enhancement) in game reproduction. On the other hand, image super-resolution technology has further promoted the development of other problems in the field of computer vision, such as medical imaging, surveillance imaging, and satellite imaging. Currently, image super-resolution solutions mainly include single-image-based super-resolution (SISR) technology and reference image-based super-resolution (RefSR) technology.

SUMMARY

According to implementations of the subject matter described herein, there is provided a solution for image processing. In this solution, first and second information is determined based on texture features of an input image and a reference image. The first information at least indicates for a first pixel block in the input image a second pixel block in the reference image most relevant to the first pixel block in terms of the texture features, and the second information at least indicates relevance of the first pixel block to the second pixel block. A transferred feature map with a target resolution is determined based on the first information and the reference image. The transferred feature map comprises a feature block corresponding to the first pixel block and the feature block comprising a texture feature of the second pixel block. The input image is transformed into an output image with the target resolution based on the transferred feature map and the second information. The output image reflects a texture feature of the reference image. In this solution, using information which is at a pixel-block-level and relates to the texture features makes the search and transfer of texture features more accurate, thereby reducing texture blur and texture distortion. In addition, this solution can efficiently and accurately transfer the textures of the reference image, and obtain a clearer and more realistic image processing result.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

BRIEF DESCRIPTION OF THE DRAWINGS

Throughout the drawings, the same or similar reference signs refer to the same or similar elements.

DETAILED DESCRIPTION

The subject matter described herein will now be discussed with reference to several example implementations. It is to be understood these implementations are discussed only for the purpose of enabling persons skilled in the art to better understand and thus implement the subject matter described herein, rather than suggesting any limitations on the scope of the subject matter.

As used herein, the term "includes" and its variants are to be read as open terms that mean "includes, but is not limited to." The term "based on" is to be read as "based at least in part on." The term "one implementation" and "an implementation" are to be read as "at least one implementation." The term "another implementation" is to be read as "at least one other implementation." The terms "first," "second," and the like may refer to different or same objects. Other definitions, explicit and implicit, may be included below.

As used herein, the term "neural network" can handle inputs and provide corresponding outputs and it usually includes an input layer, an output layer and one or more hidden layers between the input and output layers. The neural network used in the deep learning applications usually includes a plurality of hidden layers to extend the depth of the network. Individual layers of the neural network are connected in sequence, such that an output of a preceding layer is provided as an input for a following layer, where the input layer receives the input of the neural network while the output of the output layer acts as the final output of the neural network. Each layer of the neural network includes one or more nodes (also known as processing nodes or neurons) and each node processes the input from the preceding layer. CNN is a type of neural network that includes one or more convolutional layers, which are used to perform convolution operations on their respective inputs. CNN may be used in various scenarios and is particularly suitable for processing image or video data. In the text, the terms "neural network", "network" and "neural network model" are used interchangeably.

Example Environment

Figure 1:
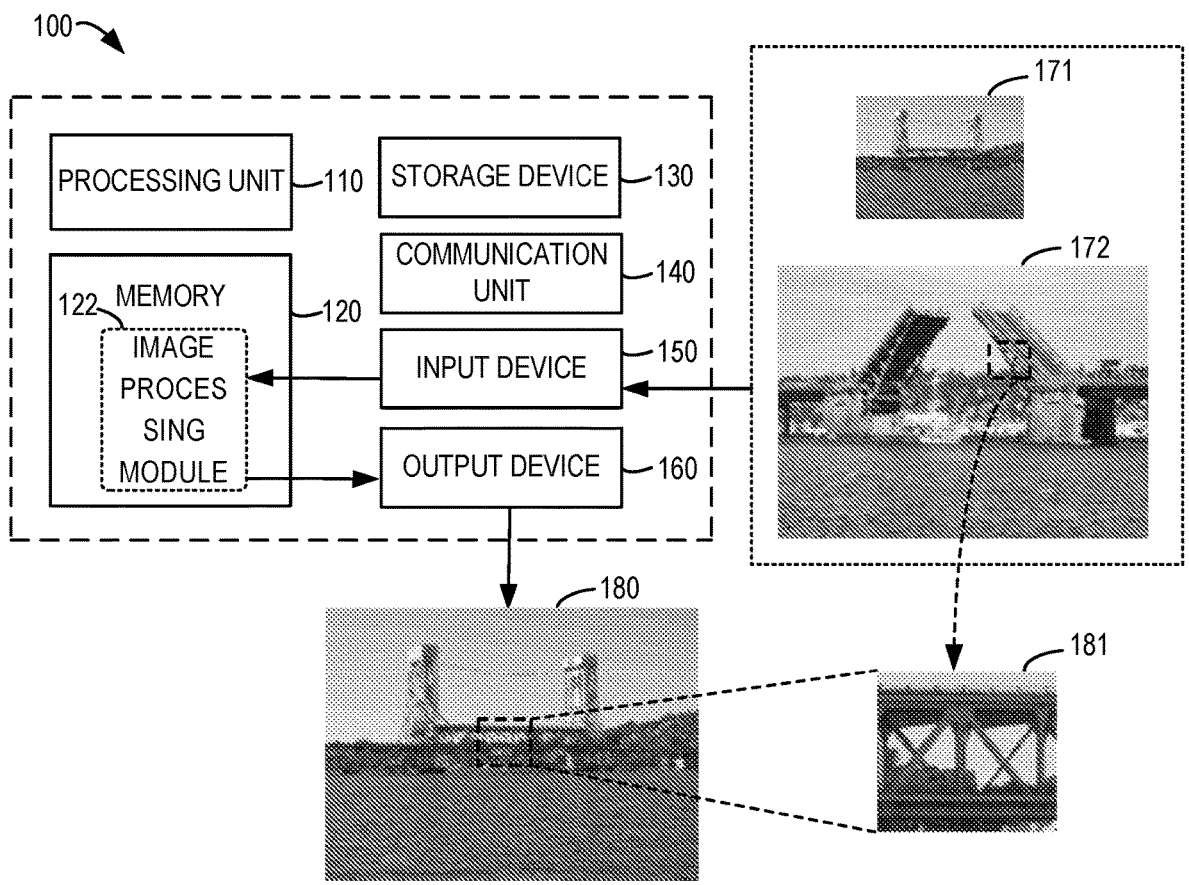
FIG. 1 illustrates a block diagram of a computing device which can implement a plurality of implementations of the subject matter described herein.

FIG. 1 illustrates a block diagram of a computing device 100 that can implement a plurality of implementations of the subject matter described herein. It should be understood that the computing device 100 shown in FIG. 1 is only exemplary and shall not constitute any limitation on the functions and scopes of the implementations described by the subject matter described herein. As shown in FIG. 1, the computing device 100 includes a computing device 100 in the form of a general purpose computing device. Components of the computing device 100 may include, but are not limited to, one or more processors or processing units 110, a memory 120, a storage device 130, one or more communication units 140, one or more input devices 150, and one or more output devices 160.

In some implementations, the computing device 100 may be implemented as various user terminals or service terminals having a computing capability. The service terminals may be servers, large-scale computing devices, and the like provided by a variety of service providers. The user terminal, for example, is a mobile terminal, a fixed terminal or a portable terminal of any type, including a mobile phone, a site, a unit, a device, a multimedia computer, a multimedia tablet, Internet nodes, a communicator, a desktop computer, a laptop computer, a notebook computer, a netbook computer, a tablet computer, a Personal Communication System (PCS) device, a personal navigation device, a Personal Digital Assistant (PDA), an audio/video player, a digital camera/video, a positioning device, a television receiver, a radio broadcast receiver, an electronic book device, a gaming device or any other combination thereof consisting of accessories and peripherals of these devices or any other combination thereof. It may also be predicted that the computing device 100 can support any type of user-specific interface (such as a "wearable" circuit, and the like).

The processing unit 110 may be a physical or virtual processor and may execute various processing based on the programs stored in the memory 120. In a multi-processor system, a plurality of processing units execute computer-executable instructions in parallel to enhance parallel processing capability of the computing device 100. The processing unit 110 can also be referred to as a central processing unit (CPU), microprocessor, controller and microcontroller.

The computing device 100 usually includes a plurality of computer storage mediums. Such mediums may be any attainable medium accessible by the computing device 100, including but not limited to, a volatile and non-volatile medium, a removable and non-removable medium. The memory 120 may be a volatile memory (e.g., a register, a cache, a Random Access Memory (RAM)), a non-volatile memory (such as, a Read-Only Memory (ROM), an Electrically Erasable Programmable Read-Only Memory (EEPROM), flash), or any combination thereof. The memory 120 may include a conversion module 122, and these program modules are configured to perform functions of various implementations described herein. The conversion module 122 may be accessed and run by the processing unit 110 to implement corresponding functions The storage device 130 may be a removable or non-removable medium, and may include a machine-readable medium which may be used for storing information and/or data and be accessed within the computing device 100. The computing device 100 may further include additional removable/non-removable, volatile/non-volatile storage mediums. Although not shown in FIG. 1, there may be provided a disk drive for reading from or writing into a removable and non-volatile disk and an optical disc drive for reading from or writing into a removable and non-volatile optical disc. In such cases, each drive may be connected to a bus (not shown) via one or more data medium interfaces.

The communication unit 140 implements communication with another computing device via a communication medium. Additionally, functions of components of the computing device 100 may be realized with a single computing cluster or a plurality of computing machines, and these computing machines may communicate through communication connections. Therefore, the computing device 100 may operate in a networked environment using a logic connection to one or more other servers, a Personal Computer (PC) or a further general network node.

The input device 150 may be one or more various input devices, such as a mouse, a keyboard, a trackball, a voice-input device, and the like. The output device 160 may be one or more output devices, e.g., a display, a loudspeaker, a printer, and so on. The computing device 100 may also communicate through the communication unit 140 with one or more external devices (not shown) as required, where the external device, e.g., a storage device, a display device, and so on, communicates with one or more devices that enable users to interact with the computing device 100, or with any device (such as a network card, a modem, and the like) that enable the computing device 100 to communicate with one or more other computing devices. Such communication may be executed via an Input/output (I/O) interface (not shown).

In some implementations, apart from being integrated on an individual device, some or all of the respective components of the computing device 100 may also be set in the form of a cloud computing architecture. In the cloud computing architecture, these components may be remotely arranged and may cooperate to implement the functions described by the subject matter described herein. In some implementations, the cloud computing provides computation, software, data access and storage services without informing a terminal user of physical locations or configurations of systems or hardware providing such services. In various implementations, the cloud computing provides services via a Wide Area Network (such as Internet) using a suitable protocol. For example, the cloud computing provider provides, via the Wide Area Network, the applications, which can be accessed through a web browser or any other computing component. Software or components of the cloud computing architecture and corresponding data may be stored on a server at a remote location. The computing resources in the cloud computing environment may be merged or spread at a remote datacenter. The cloud computing infrastructure may provide, via a shared datacenter, the services even though they are shown as a single access point for the user. Therefore, components and functions described herein can be provided using the cloud computing architecture from a service provider at a remote location. Alternatively, components and functions may also be provided from a conventional server, or they may be mounted on a client device directly or in other ways.

The computing device 100 may be used to implement image processing in various implementations of the subject matter described herein. As shown in FIG. 1, the computing device 100 may receive a reference image 172 and an input image 171 to be transformed to a target resolution through the input device 150. In general, the input image 171 has a resolution lower than the target resolution, and may be referred to as a low-resolution image. The resolution of the reference image 172 may be equal to or greater than the target resolution. The computing device 100 may transform the input image 171 into an output image 180 having the target resolution based on the reference image 172. The output image 180 reflects texture features of the reference image 172. For example, as shown in FIG. 1, an area 181 of the output image 180 may reflect the texture features transferred from the reference image 172. The output image 180 may also be referred to as a high-resolution image or a super-resolution (SR) image. In the text, "reflecting the texture features of the reference image" or similar expressions shall be interpreted as "reflecting at least part of the texture features of the reference image".

As mentioned above, the solution to the image super-resolution mainly includes a single-image-based super-resolution (SISR) technology and a reference image-based super-resolution (RefSR) technology. In a traditional SISR, a deep convolutional neural network is generally trained to fit a recovery operation from the low-resolution image to the high-resolution image. This process involves a typical one-to-many problem, because the same low-resolution image may correspond to a plurality of feasible high-resolution images. Therefore, the model trained by the traditional one-to-one fitting method is more inclined to fit an average value of a variety of feasible results, so that a finally-formed high-resolution image is still relatively fuzzy at the complex textures, and it is difficult to obtain satisfactory results. In recent years, some methods have introduced generative adversarial training to constrain the recovered image to be in the same distribution as the real high-resolution image. These methods may alleviate the above problems to a certain extent, but they also introduce some unreal texture problems.

RefSR technology was proposed with respect to the above problems. In RefSR, the entire super-resolution recovery process is assisted by using a high-resolution image similar to the input image. The introduction of the high-resolution reference image converts the problem of image super-resolution from texture recovery/generation to texture search and transfer, making the super-resolution results have a significant improvement in visual effects. However, it is still difficult for the conventional RefSR solutions to achieve satisfactory image super-resolution results. For example, in some cases, there are inaccurate and even incorrect texture search and transfer.

Some problems existing in the conventional image super-resolution solutions have already been discussed above. According to the implementation of the subject matter described herein, a solution for image processing is provided to solve the above-mentioned problems and one or more of other potential problems. In this solution, multi-level attention information is used to transfer the texture in the reference image to the input image to generate an output image with the target resolution. The multi-level attention information may indicate a relevance of the pixel block of the reference image to the pixel block of the input image in terms of the texture features. The multi-level attention information may be used to make the search and transfer of texture features more accurate, thereby reducing texture blur and texture distortion. In some implementations, feature integration across different resolution scales may also be implemented. In this implementation, by fusing the texture features of the reference image at different resolution scales, a feature expression capability is enhanced, which helps to generate more realistic images. In addition, in some implementations, a texture extractor used to extract texture features from the reference image and the input image may be trained for an image super-resolution task. In this implementation, more accurate texture features may be extracted to further promote the generation of clear and realistic output images.

Various example implementations of the solution will be described in detail below with reference to the accompanying drawings.

System Architecture

Figure 2:
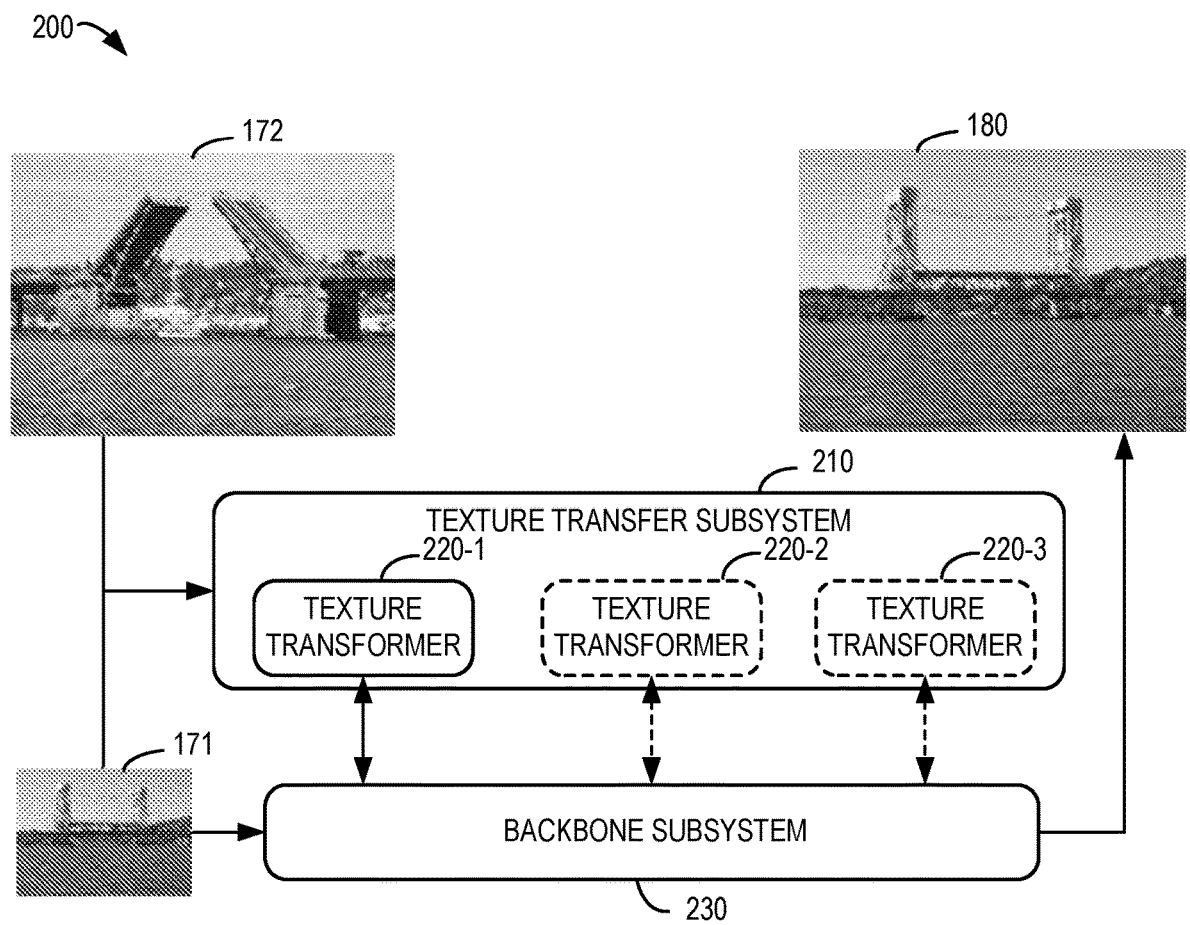
FIG. 2 illustrates an architecture diagram of a system for image processing according to implementations of the subject matter described herein.

FIG. 2 illustrates an architecture diagram of a system for image processing according to implementations of the subject matter described herein. The system 200 may be implemented in the computing device 100 of FIG. 1. For example, in some implementations, the system 200 may be implemented as at least a part of the image processing module 122 of the computing device 100 of FIG. 1, that is, implemented as a computer program module. As shown in FIG. 2, the system 200 may generally include a texture transfer subsystem 210 and a backbone subsystem 230. It should be appreciated that the structure and function of the system 200 are described only for exemplary purposes and do not imply any limitation on the scope of the subject matter described herein. The implementation of the subject matter described herein may also be implemented in different structures and/or functions.

As shown in FIG. 2, the input of the system 200 includes an input image 171 to be transformed to a target resolution and a reference image 172. The input image 171 is generally a low-resolution image with a resolution lower than the target resolution. The reference image 172 may be obtained in any suitable way. In some implementations, the resolution of the reference image 172 may be equal to or greater than the target resolution. The output of the system 200 is an output image 180 transformed to the target resolution. Compared with the input image 171, the output image 180 is not only enlarged, but also reflects the texture features transferred from the reference image 172.

The texture transfer subsystem 210 may transfer the texture features of the reference image 172 to the input image 171. The texture transfer subsystem 210 includes at least a texture transformer 220-1, which may be configured to transfer the texture features of the reference image 172 to the input image 171 at the target resolution, and output a synthesized feature map having the target resolution. As used herein, the term "synthesized feature map" refers to a feature map including an image feature of the input image 171 itself and a texture feature transferred from the reference image 172. Hereinafter, the texture transformer 220-1 may sometimes be referred to as a texture transformer corresponding to the target resolution.

In some implementations, the texture transfer subsystem 210 may include stacked texture transformers corresponding to multiple resolutions. As shown in FIG. 2, in addition to the texture transformer 220-1, the texture transfer subsystem 210 may further include at least one of the texture transformer 220-2 and the texture transformer 220-3. The texture transformer 220-2 and the texture transformer 220-3 may be configured to transfer the texture feature of the reference image 172 to the input image 171 at a resolution lower than the target resolution, and output a synthesized feature map with a corresponding resolution. For example, the texture transformer 220-2 may correspond to a first resolution lower than the target resolution, and the texture transformer 220-3 may correspond to a second resolution lower than the first resolution.

The multiple resolutions corresponding to the stacked texture transformers may include the target resolution and any suitable resolution. In one implementation, the multiple resolutions corresponding to the stacked texture transformers may include the target resolution, an initial resolution of the input image 171, and one or more resolutions between the target resolution and the initial resolution. In this implementation, the resolution of the input image may be increased step by step to further optimize the quality of the output image, as described below with reference to FIG. 4. As an example, if the target resolution is to magnify the input image 171 by 4 times (4×), the texture transformer 220-2 may magnify by 2 times (2×) corresponding to the input image 171, and the texture transformer 220-3 may correspond to the initial resolution of the input image 171. Hereinafter, the texture transformers 220-1, 220-2, and 220-3 may be collectively referred to as texture transformers 220. Hereinafter, the implementation of the texture transformer 220 will be described with reference to FIG. 3.

The backbone subsystem 230 may extract an image feature of the input image 171, including but not limited to a color feature, a texture feature, a shape feature, a spatial relationship feature, etc. of the input image 171. The backbone subsystem 230 may provide the extracted image feature to the texture transfer subsystem 210, so that the texture transformer 220 may generate a synthesized feature map. The backbone subsystem 230 may also process the synthesized feature map generated by the texture transformer 220 to obtain the output image 180. For example, the backbone subsystem 230 may include a convolutional neural network to extract the image feature and to process synthesized feature maps. In some implementations, the convolutional neural network may include a residual network.

In an implementation where the texture transfer subsystem 210 includes stacked texture transformers, the backbone subsystem 230 may further include a cross-scale feature integration (CSFI) module (not shown). The CSFI module may be configured to exchange feature information between different resolution scales. For example, the CSFI module may transform the synthesized feature map output by the texture transformer 220-2 and provide it to the texture transformer 220-1. Additionally, the CSFI module may also transform the synthesized feature map output by the texture transformer 220-1, and further combine the transformed synthesized feature map with the synthesized feature map output by the texture transformer 220-2. In addition, the CSFI module may further combine synthesized feature maps output by different texture transformers. The operation of the CSFI module will be described below with reference to FIG. 4.

Texture Transformer

Figure 3:
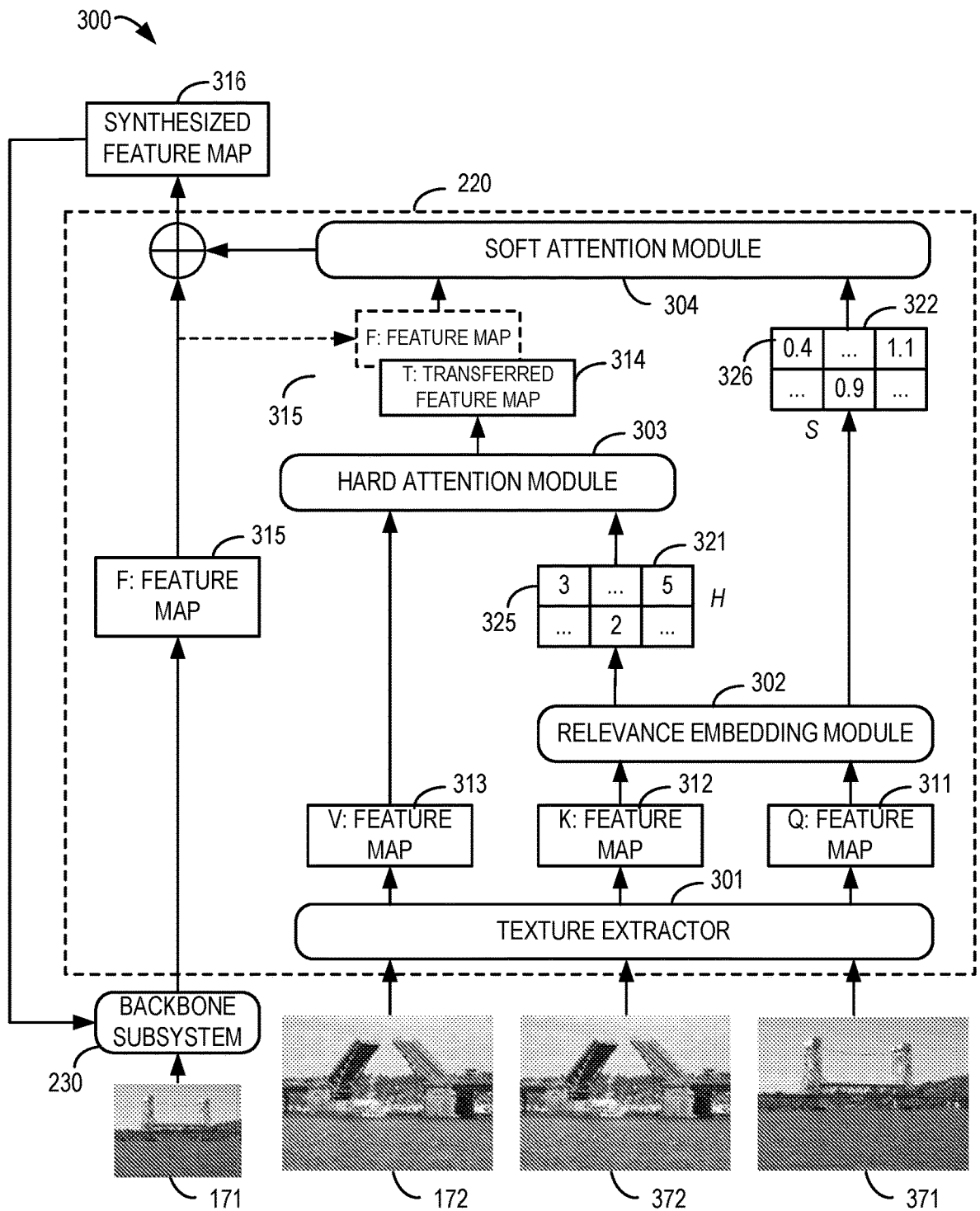
FIG. 3 illustrates a block diagram of a texture transformer according to some implementations of the subject matter described herein.

FIG. 3 illustrates a block diagram 300 of a texture transformer 220 according to some implementations of the subject matter described herein. In the example of FIG. 3, the texture transformer 220 includes a texture extractor 301, a relevance embedding module 302, a hard attention module 303 and a soft attention module 304. The texture extractor 301 may be configured to extract texture features of the input image 171 and the reference image 172. The relevance embedding module 302 may be configured to determine first information 321 and second information 322, which indicate the relevance of pixel blocks of the input image 171 to pixel blocks of the reference image 172 in terms of the texture features, based on the extracted texture features. The first information 321 may also be referred to as hard attention information, and is exemplarily shown as a hard attention map in FIG. 3. The second information 322 may also be referred to as soft attention information, and is exemplarily shown as a soft attention map in FIG. 3.

The hard attention module 303 may be configured to determine a transferred feature map 314 based on the first information 321 and the reference image 172. A feature block in the transferred feature map 314 includes a texture feature of the pixel block in the reference image 172. As shown in FIG. 3, the transferred feature map 314 may be represented as T. The soft attention module 304 may be configured to generate a synthesized feature map 316 based on the second information 322, the transferred feature map 314 and the feature map 315 from the backbone subsystem 230. The synthesized feature map 316 may be provided to the backbone subsystem 230 to be further processed into an output image 180. As shown in FIG. 3, the feature map 315 from the backbone subsystem 230 may be represented as F.

A working principle of the texture transformer 220 will be described in detail below.

Hereinafter, the original reference image 172 and the input image 171 may be represented as Ref and LR, respectively. In the RefSR task, texture extraction for the reference image Ref is necessary. In some implementations, the original input image 171 and the reference image 172 may be applied to the texture extractor 301.

In some implementations, the reference image 172 and the input image 171 may be preprocessed before the texture extractor 301 extracts texture features of the reference image 172 and the input image 171. As shown in FIG. 3, in some implementations, the input image 171 may be up-sampled with a predetermined factor to obtain a preprocessed input image 371, which may be represented as LR↑. For example, the preprocessed input image 371 may have a target resolution. The reference image 172 may be sequentially down-sampled and up-sampled with the predetermined factor to obtain a preprocessed reference image 372, which may be represented as Ref↓↑. As an example, 4× up-sampling (for example, bicubic interpolation) may be applied to the input image 171 to obtain a preprocessed input image 371. Down-sampling and up-sampling (for example, bicubic interpolation) with the same factor of 4× may be sequentially applied to the reference image 172 to obtain the preprocessed reference image 372.

In this implementation, the preprocessed input image 371 and the preprocessed reference image 372 may be in the same distribution. This may facilitate the texture extractor 301 to more accurately extract texture features in the input image 171 and the reference image 172.

As shown in FIG. 3, the preprocessed input image 371, the preprocessed reference image 372 and the reference image 172 may be applied to the texture extractor 301. The texture extractor 301 may perform texture feature extraction in any suitable manner.

For the extraction of texture features, a conventional main method is to input the processed image into a pre-trained classification model (for example, a VGG network in computer vision) to extract some shallow features in the middle as the texture feature of the image. However, this method has some drawbacks. First of all, a training target of a classification model such as VGG network is a semantic-oriented image category label, and its high-level semantic information is very different from low-level texture information. Secondly, for different tasks, the texture information that needs to be extracted is different, and the use of the pre-trained and fixed-weight VGG network lacks flexibility.

In view of this, in some implementations, instead of using the pre-trained classification model, a learnable texture extractor 301 may be implemented. The texture extractor 301 may be implemented using a neural network (which may also be referred to as a first neural network in the text). For example, the neural network may be a shallow convolutional neural network, and the parameters of the neural network may also be continuously updated during the training process of the texture transformer 220. In this way, the trained texture extractor 301 may be more suitable for texture feature extraction for RefSR tasks, and thus can capture more accurate texture features from the reference image and the input image. Such a texture extractor can extract texture information most suitable for image generation tasks, thereby providing a good foundation for subsequent texture search and transfer. This in turn may promote the generation of high-quality results. The training of the texture extractor 301 will be described below in conjunction with the design of a loss function.

As shown in FIG. 3, the texture extractor 301 may generate feature maps 311, 312, and 313 representing texture features. The feature maps 311, 312, and 313 correspond to the preprocessed input image 371 and reference image 372, and the reference image 172, respectively. If the texture extractor 301 is represented by LTE, and the feature maps 311, 312 and 313 are represented by Q, K, and V, respectively, the process of extracting texture features may be expressed as:

$$Q = LTE(LR\uparrow) \quad (1)$$

$$K = LTE(Ref\downarrow\uparrow) \quad (2)$$

$$V = LTE(Ref) \quad (3)$$

where LTE(•) represents the output of the texture extractor 301. The feature map 311 (which may also be referred to as a first feature map herein) corresponds to a query Q, which represents a texture feature extracted from a low-resolution input image (or a preprocessed input image) for use in texture search; the feature map 312 (which may also be referred to as a second feature map herein) corresponds to a key K, which represents a texture feature extracted from the high-resolution reference image (or preprocessed reference image) for use in texture search; the feature map 313 corresponds to a value V, which represents a texture feature extracted from the original reference image for texture transfer.

Each of the input image 171, the reference image 172, the preprocessed input image 371 and the preprocessed reference image 372 may include a plurality of pixel blocks. Each pixel block may include a group of pixels, and there might be overlapping pixels among different pixel blocks. The pixel block may be a square (for example, including 3×3 pixels), a rectangle (for example, including 3×6 pixels), or any other suitable shape. Accordingly, each of the feature maps 311-313 may include a plurality of feature blocks. Each feature block may correspond to a pixel block and include a texture feature of the pixel block. For example, in the example of FIG. 3, the feature map 311 represented as Q may include a plurality of feature blocks corresponding to a plurality of pixel blocks in the preprocessed input image 371. Similarly, the feature map 312 represented as K may include a plurality of feature blocks corresponding to a plurality of pixel blocks in the preprocessed reference image 372; the feature map 313 represented as V may include a plurality of feature blocks corresponding to a plurality of pixel blocks in the original reference image 172. The feature block may have the same size as the corresponding pixel block.

As shown in FIG. 3, the feature map 311 and 312 may be used by the relevance embedding module 302. The relevance embedding module 302 may be configured to determine the relevance of the reference image 172 to the input image 171 in terms of the texture feature by estimating similarity between the feature map 311 as the query Q and the feature map 312 as the key K. Specifically, the relevance embedding module 302 may extract feature blocks from the feature map 311 and 312 respectively, and then calculate the relevance of a feature block in the feature map 311 to a feature block in the feature map 312 by calculating an inner product. The larger the inner product is, the stronger the relevance of the corresponding two feature blocks is. Correspondingly, the more transferable high-frequency texture features there are. Conversely, the smaller the inner product is, the weaker the relevance of the two corresponding feature blocks is. Accordingly, the fewer transferrable high-frequency texture features there are.

In some implementations, sliding windows may be applied to the feature map 311 and 312, respectively, to determine the feature block under consideration. The feature block (for example, patch) from the feature map 311 may be represented as $q_i$ ($i \in [1, H_{LR} \times W_{LR}]$), and the feature block (for example, patch) from the feature map 312 may be represented as $k_j$ ($j \in [1, H_{Ref} \times W_{Ref}]$), where $H_{LR} \times W_{LR}$ represents the number of pixel blocks in the input image 171, and $H_{Ref} \times W_{Ref}$ represents the number of pixel blocks in the reference image 172. Then, the relevance $r_{i,j}$ of any pair of feature blocks $q_i$ and $k_j$ may be represented by the inner product of normalized feature blocks $$\frac{q_i}{\|q_i\|} \text{ and } \frac{k_j}{\|k_j\|}$$

as:

$$r_{i,j} = \left\langle \frac{q_i}{\|q_i\|}, \frac{k_j}{\|k_j\|} \right\rangle. \quad (4)$$

As an example, a sliding window having the same size as the pixel block does in the input image 171 may be applied to the feature map 311 to locate the feature block $q_i$ in the feature map 311. For a given feature block $q_i$, a sliding window having the same size as the pixel block does in the reference image 172 may be applied to the feature map 312 to locate the feature block $k_j$ in the feature map 312. Then, the relevance of feature blocks $q_i$ to $k_j$ may be calculated based on equation (4). In this way, the relevance of any pair of feature blocks $q_i$ to $k_j$ may be determined.

The relevance embedding module 302 may further determine the first information 321 based on the relevance. The first information 321 may also be referred to as hard attention information, and is exemplarily shown as a hard attention map H in FIG. 3. The first information 321 or hard attention information may be used to transfer texture features from the reference image 172. For example, the first information 321 may be used to transfer the texture feature of the reference image 172 from the feature map 313 as the value V. The traditional attention mechanism uses a weighted sum of features from V for each feature block. However, this operation causes a blur effect, thus high-resolution texture features cannot be transferred. Therefore, in the attention mechanism of the subject matter described herein, the local relevance in terms of pixel blocks is considered.

For example, the relevance embedding module 302 may generate the hard attention map H as shown in FIG. 3 based on the relevance $r_{i,j}$. The $i^{th}$ element $h_i$ ($i \in [1, H_{LR} \times W_{LR}]$) in the hard attention map H may be calculated from the following equation:

$$h_i = \arg\max_j r_{i,j}. \quad (5)$$

In view of the correspondence between the pixel blocks and the feature blocks mentioned above, the $i^{th}$ element $h_i$ in the hard attention map H may correspond to the $i^{th}$ pixel block in the input image 171, and the value of $h_i$ may represent an index of the pixel block in the reference image 172 that is most relevant (that is, the highest degree of relevance) to the $i^{th}$ pixel block in terms of the texture feature. For example, the value of the element 325 shown in FIG. 3 is 3, which means that the pixel block in the upper left corner of the input image 171 is most relevant to the pixel block with an index 3 in the reference image in terms of the texture feature.

Therefore, it may be understood that for the pixel block in the input image 171, the first information 321 indicates a position of the pixel block in the reference image 172 that is most relevant in terms of the texture feature. In addition, although in the above example, the first information 321 indicates the most relevant pixel block in the reference image 172 for each pixel block in the input image 171, but this is only illustrative. In some implementations, the first information 321 may indicate the most relevant pixel block in the reference image 172 for one or some pixel blocks in the input image 171.

The relevance embedding module 302 may further determine a second information 322 based on the relevance. The second information 322 may also be referred to as soft attention information, and is exemplarily shown as a soft attention map S in FIG. 3. The second information 322 or soft attention information may be used to weight the texture features from the reference image 172 to fuse the texture features into the input image 171.

For example, the relevance embedding module 302 may generate the soft attention map S as shown in FIG. 3 based on the relevance $r_{i,j}$. The $i^{th}$ element $s_i$ in the soft attention map S may be calculated from the following equation:

$$s_i = \max_j r_{i,j}. \quad (6)$$

It may be appreciated that the $i^{th}$ element $h_i$ in the hard attention map H corresponds to the $i^{th}$ element $s_i$ in the soft attention map S. In view of the correspondence between the pixel blocks and the feature blocks mentioned above, the $i^{th}$ element $s_i$ in the soft attention map S may correspond to the $i^{th}$ pixel block in the input image 171, and the value of $s_i$ may represent the relevance of the $i^{th}$ pixel block in the input image 171 to the pixel block with an index $h_i$ in the reference image 172. For example, the value of the element 326 shown in FIG. 3 is 0.4, which means that the relevance of the pixel block in the upper left corner of the input image 171 to the pixel block with the index 3 (as indicated by the hard attention map H) in the reference image 172 is 0.4.

The hard attention module 303 may be configured to determine the transferred feature map 314 based on the first information 321 and the feature map 313 of the reference image 172. The transferred feature map 314 may be represented as T. Each feature block of the transferred feature map 314 corresponds to one pixel block in the input image 171, and includes the texture feature (for example, particularly high-frequency texture feature) of the pixel block in the reference image 172 that is most relevant to that pixel block.

The resolution of the transferred feature map 314 may be relevant to a resolution scale corresponding to the texture transformer 220. In the texture transformer 220-1 corresponding to the target resolution, the transferred feature map 314 has the target resolution. In an implementation where the texture transfer subsystem 210 includes a stacked texture transformer, in the texture transformer 220-2 corresponding to a first resolution, the transferred feature map 314 may have a first resolution; in the texture transformer 220-3 corresponding to a second resolution, the transferred feature map 314 may have a second resolution.

As an example, in order to obtain the transferred feature map 314 including the texture features transferred from the reference image 172, an index selection operation may be applied to the feature blocks of the feature map 313 by using the hard attention information 321 as an index. For example, the value of the $i^{th}$ feature block in the transferred feature map 314 represented as T may be calculated from the following equation:

$$t_i = v_{h_i} \quad (7)$$

where $t_i$ represents the value of the $i^{th}$ feature block in T, and it is the value of the feature block with an index $h_i$ in the feature map 313 as the value V. It should be understood that the feature block with an index $h_i$ in the feature map 313 represents the feature of the pixel block with an index $h_i$ in the reference image 172. Therefore, the $i^{th}$ feature block in the transferred feature map 314 includes the feature of the pixel block with an index $h_i$ in the reference image 172.

The example process of generating the transferred feature map 314 and the second information 322 is described above. As shown in FIG. 3, the backbone subsystem 230 may provide the texture transformer 220 with a feature map 315 for the input image 171. The feature map 315 that may be represented as F at least includes the image feature of the input image 171, including but not limited to color features, texture features, shape features, spatial relationship features, and so on. In some implementations, the feature map 315 may include image feature of the input image 171. For example, the backbone subsystem 230 may use a trained neural network (which may also be referred to as a second neural network herein) to extract the image feature of the original input image 171, and feed it to the texture transformer 220 as the feature map 315. In some implementations, in addition to the image feature of the input image 171, the feature map 315 may further include texture features transferred from the reference image 172. For example, in an implementation where the texture transfer subsystem 210 includes a stacked texture transformer, the feature map 315 may further include texture features transferred by another texture transformer from the reference image 172 at another resolution. For example, the synthesized feature map output from the texture transformer 220-2, after being transformed to the target resolution, may be provided to the texture transformer 220-1 as the feature map 315. This implementation will be described below with reference to FIG. 4.

In some implementations, the soft attention module 304 may directly apply the second information 322 (for example, the soft attention map S as shown) to the transferred feature map 314. Then, the transferred feature map 314 to which the second information 322 is applied may be fused into the feature map 315 to generate a synthesized feature map 316.

In some implementations, as shown in FIG. 3, the feature map 315 from the backbone subsystem 230 may be fed to the soft attention module 304. Instead of directly applying the second information 322 to the transferred feature map 314, the soft attention module 304 may apply the second information 322 to the combination of the transferred feature map 314 and the feature map 315 as the output of the soft attention module 304. The output of the soft attention module 304 may be further added to the feature map 315 from the backbone subsystem 230 to generate the synthesized feature map 316 as the output of the texture transformer 220. In this way, the image feature of the input image 171 may be better utilized.

As an example, the above-mentioned operation of generating the synthesized feature map 316 based on the feature map 315 (represented as F), the transferred feature map 314 (represented as T), and the soft attention map S may be expressed as:

$$F_{out}=F+\text{Conv}(\text{Concat}(F,T))\odot S \quad (8)$$

where $F_{out}$ represents the synthesized feature map 316. Conv and Concat represent a convolutional layer and Concatenate operation in channel dimension, respectively. $X \odot Y$ represents element-wise multiplication between feature map X and Y.

It may be seen from the above that the relevance indicated by the soft attention map S is applied as a weight to the combination of the image feature and the transferred texture feature. In this way, the texture feature with strong relevance in the reference image 172 may be given a relatively large weight and thus enhanced; at the same time, the texture feature with weak relevance in the reference image 172 may be given a relatively small weight and thus inhibited. Correspondingly, the finally obtained output image 180 will tend to reflect the texture feature with strong relevance in the reference image 172.

The texture transformer according to some implementations of the subject matter described herein is described above with reference to FIG. 3. A multi-level attention mechanism including hard attention and soft attention is used in this texture transformer. The hard attention mechanism may be used to localize the transfer of texture features, and the soft attention mechanism may be used to make the localized texture features more accurate and used purposefully. Therefore, the texture transformer using the multi-level attention mechanism can efficiently and accurately transfer the relevant texture features from the reference image to the low-resolution input image. In some implementations, the learnable texture extractor 301 may more accurately extract the texture features of the reference image and the input image, thereby further promoting the accuracy of image super-resolution.

As shown in FIG. 3, the synthesized feature map 316 generated by the texture transformer 220 may be provided to the backbone subsystem 230. In an implementation in which the texture transfer subsystem 210 includes a texture transformer 220-1, the second neural network (for example, a convolutional neural network) in the backbone subsystem 230 may process the synthesized feature map 316 into an output image 180. In an implementation in which the texture transfer subsystem 210 includes a stacked texture transformer, the backbone subsystem 230 may fuse synthesized feature maps generated by different texture transformers. An example of such an implementation will be described below with reference to FIG. 4.

The subject matter described herein has mainly been described above in the context of super-resolution tasks. However, it should be understood that the image processing scheme according to the subject matter described herein is not limited to super-resolution tasks. For example, when the target resolution is equal to or lower than the original resolution of the input image, the texture transformer described above may also be used to transfer texture features from the reference image.

Cross-Scale Feature Integration

Figure 4:
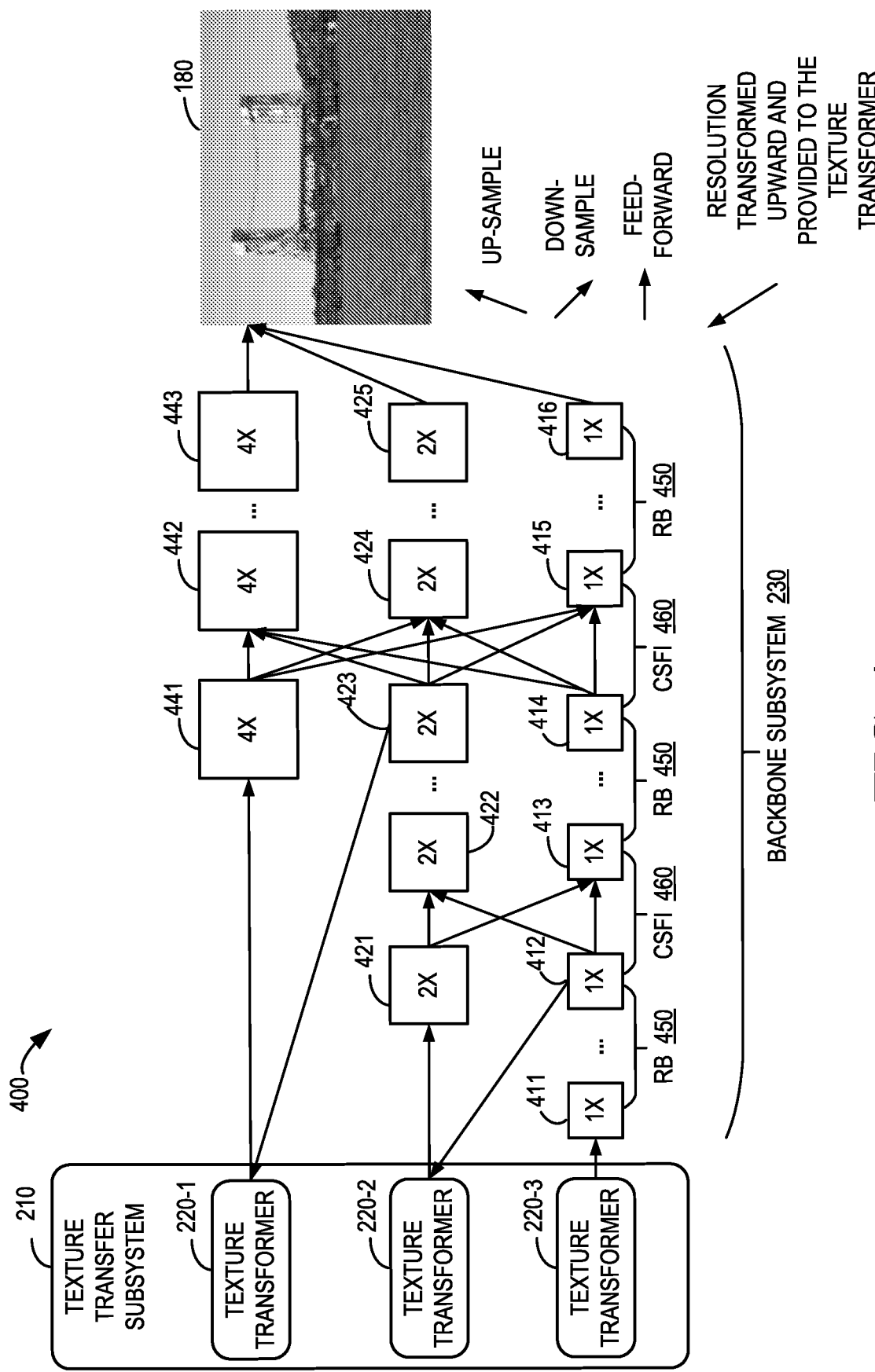
FIG. 4 illustrates a block diagram of cross-scale feature integration according to some implementations of the subject matter described herein.

As mentioned above, in an implementation where the texture transfer subsystem 210 includes a stacked texture transformer, the backbone subsystem 230 may implement cross-scale feature integration. FIG. 4 illustrates a block diagram 400 of cross-scale feature integration according to some implementations of the subject matter described herein. As shown in FIG. 4, the texture transfer subsystem 210 may include stacked texture transformers 220-1, 220-2, and 220-3. The texture transformer 220-1 may correspond to the target resolution, that is, the texture transformer 220-1 may transfer the texture feature of the reference image 172 at the scale of the target resolution. As such, the synthesized feature map 441 generated by the texture transformer 220-1 may have a target resolution. The texture transformer 220-2 may correspond to a first resolution lower than the target resolution, that is, the texture transformer 220-2 may transfer the texture feature of the reference image 172 at the scale of the first resolution. As such, the synthesized feature map 421 generated by the texture transformer 220-2 may have the first resolution. The texture transformer 220-3 may correspond to the second resolution lower than the first resolution, that is, the texture transformer 220-3 may transfer the texture features of the reference image 172 at the scale of the second resolution. As such, the synthesized feature map 411 generated by the texture transformer 220-3 may have the second resolution.

In the example of FIG. 4, the target resolution aims to magnify the input image 171 by 4 times (4×), the first resolution aims to magnify the input image 171 by 2 times (2×), and the second resolution is the original resolution (1×) of input image 171.

As mentioned above, the backbone subsystem 230 may include a second neural network to extract the image feature of the input image 171 and process the synthesized feature map 316 generated by the texture transformer 220. In some implementations, the second neural network may include a residual network. The use of residual network may improve the accuracy of image processing by increasing the depth of the network. The residual network may generally include a plurality of residual blocks (RB). FIG. 4 shows a plurality of residual blocks 450 included in the backbone subsystem 230.

As shown in FIG. 4, in some implementations, the backbone subsystem 230 may further include a CSFI module 460, which is configured to exchange feature information at different resolution scales. The CSFI module 460 may fuse synthesized feature maps at different resolution scales. For each resolution scale, the CSFI module 460 may transform the synthesized feature maps at other resolution scales to this resolution (for example, up-sampling or down-sampling), and then perform a concatenate operation on the transformed synthesized feature map which comes from other resolution scales and the synthesized feature map at this resolution scale in the channel dimension, to obtain a new synthesized feature map at the resolution scale. Next, the convolutional layer (e.g., residual block 450) may map the new synthesized feature map to the original number of channels.

An example process of feature integration is described below with reference to FIG. 4. The backbone subsystem 230 (for example, the second neural network of the backbone subsystem 230) may process the input image 171 having the second resolution (i.e., the original resolution of the input image 171) to obtain a feature map (not shown)

including the image feature of the input image 171. This feature map may be provided to the texture transformer 220-3 corresponding to the second resolution as the feature map F shown in FIG. 3. The texture transformer 220-3 may in turn generate a synthesized feature map 411 having the second resolution. As such, the synthesized feature map 411 may include the image feature of the input image and the texture features transferred from the reference image 172 at the scale of the second resolution.

The residual block 450 may process the synthesized feature map 411 to obtain an updated synthesized feature map 412. The synthesized feature map 412 may be transformed to the first resolution, for example, by up-sampling or pixel shuffle. The transformed synthesized feature map 412 may be provided to the texture transformer 220-2 corresponding to the first resolution as the feature map F shown in FIG. 3. The texture transformer 220-2 may in turn generate a synthesized feature map 421 having the first resolution. As such, the synthesized feature map 421 may include an image feature of the input image, texture features transferred from the reference image 172 at the scale of the second resolution, and texture features transferred from the reference image 172 at the scale of the first resolution.

The CSFI module 460 may down-sample the synthesized feature map 421, having the first resolution, to the second resolution, and combine the down-sampled synthesized feature map 421 with the synthesized feature map 412 having the second resolution (e.g., concatenated in the channel dimension) into a new synthesized feature map 413. The residual block 450 may process the synthesized feature map 413, for example, apply one or more convolution operations to the synthesized feature map 413 to obtain a synthesized feature map 414 being mapped to the original number of channels.

Similarly, the CSFI module 460 may up-sample the synthesized feature map 412, having the second resolution, to the first resolution, and combine (e.g., concatenate in the channel dimension) the up-sampled synthesized feature map 412 with the synthesized feature map 421 having the first resolution into a new synthesized feature map 422. The residual block 450 may process the synthesized feature map 422, for example, apply one or more convolution operations to the synthesized feature map 422 to obtain a synthesized feature map 423 being mapped to the original number of channels.

Similar to the synthesized feature map 412, the synthesized feature map 423 may be transformed to the target resolution, for example, by up-sampling or pixel reorganization. The transformed synthesized feature map 423 may be provided to the texture transformer 220-1 corresponding to the target resolution as the feature map F shown in FIG. 3. The texture transformer 220-1 may then generate a synthesized feature map 441 with a target resolution. In this way, the synthesized feature map 441 may include the image feature of the input image, the texture features transferred from the reference image 172 at the scale of the second resolution, the texture features transferred from the reference image 172 at the scale of the first resolution, and the texture features transferred from the reference image 172 at the scale of the target resolution.

As shown in FIG. 4, the CSFI module 460 may combine (for example, concatenate in the channel dimension) the synthesized feature map 441 having a target resolution, a synthesized feature map 423 up-sampled to the target resolution, and the synthesized feature map 414 up-sampled to the target resolution into a new synthesized feature map 442. The residual block 450 may process the synthesized feature map 442, for example, apply one or more convolution operations to the synthesized feature map 442 to obtain the synthesized feature map 443 being mapped to the original number of channels.

Similarly, the CSFI module 460 may combine (for example, concatenate in the channel dimension) the synthesized feature map 423 having the first resolution, the synthesized feature map 414 up-sampled to the first resolution, and the synthesized feature map 441 down-sampled to the first resolution into a new synthesized feature map 424. The residual block 450 may process the synthesized feature map 424, for example, apply one or more convolution operations to the synthesized feature map 424 to obtain a synthesized feature map 425 being mapped to the original number of channels.

Similarly, the CSFI module 460 may combine (for example, concatenate in the channel dimension) the synthesized feature map 414 having the second resolution, the synthesized feature map 423 down-sampled to the second resolution, and the synthesized feature map 441 down-sampled to the second resolution into a new synthesized feature map 415. The residual block 450 may process the synthesized feature map 415, for example, apply one or more convolution operations to the synthesized feature map 415 to obtain a synthesized feature map 416 being mapped to the original number of channels.

The backbone subsystem 230 may then combine the synthesized feature map 443 having the target resolution, the synthesized feature map 425 having the first resolution and the synthesized feature map 416 having the second resolution to obtain the output image 180. For example, the synthesized feature map 443, the synthesized feature map 425 up-sampled to the target resolution and the synthesized feature map 416 up-sampled to the target resolution may be concatenated in a channel dimension and then be convolved to obtain the final output image 180.

In this implementation, the texture features transferred from the stacked texture transformers may be exchanged across different resolution scales. In this way, reference image features of different granularities may be fused to different scales, thereby enhancing a feature expression capability of the network. Therefore, cross-scale feature integration may further improve the quality of the output image based on the multi-level attention mechanism. In addition, it should be understood that cross-scale feature integration may achieve more powerful feature expression without significantly increasing the number of parameters and amount of calculation. For example, in some implementations, attention information may be calculated once in one texture transformer and then be shared among all texture transformers.

It should be understood that the multiple resolution scales shown in FIG. 4 are for illustration only, and are not intended to limit the scope of the subject matter described herein. In addition, it should also be understood that the texture transfer subsystem 210 may further include more or fewer (for example, two) texture transformers.

Training a Loss Function

The training of the system 200 for image processing according to the implementation of the subject matter described herein is described below. The input image and reference image used in the training process may be referred to as training input image and training reference image, respectively. The real high-resolution image corresponding to the training input image may be referred to as a ground truth image, and the image output by the system 200 during the training process may be referred to as a training output image.

The loss function used in the training system 200 may include three parts, namely a reconstruction loss function, an adversarial training loss function and a perceptual loss function. For example, the total loss function may be expressed by:

$$\mathcal{L}_{overall} = \lambda_{rec}\mathcal{L}_{rec} + \lambda_{adv}\mathcal{L}_{adv} + \lambda_{per}\mathcal{L}_{per} \quad (9)$$

where $\mathcal{L}_{rec}$, $\mathcal{L}_{adv}$ and $\mathcal{L}_{per}$ are the reconstruction loss function, the adversarial training loss function and the perceptual loss function, respectively.

The reconstruction loss function may be expressed as:

$$\mathcal{L}_{rec} = \frac{1}{CHW}\|I^{HR} - I^{SR}\|_1 \quad (10)$$

where $I^{SR}$ represents the result of super-resolution of the training input image, that is, the training output image; $I^{HR}$ represents the ground truth image; (C, H, W) is the size of the ground truth image.

In this example, L1 is selected as the reconstruction loss function. Compared with L2, L1 may get a clearer output image. The reconstruction loss function guarantees the identity between the output image and the input image by requiring the output image to be consistent with the input image pixel by pixel.

Generative adversarial networks have been proven to be effective in generating clear and visually real images. The adversarial training loss function used for the generative adversarial network may include two parts represented by Equation (11) and Equation (12):

$$\mathcal{L}_D = \mathop{\mathbb{E}}_{\tilde{x}\sim\mathbb{P}_g}[D(\tilde{x})] - \mathop{\mathbb{E}}_{x\sim\mathbb{P}_r}[D(x)] + \lambda \mathop{\mathbb{E}}_{\hat{x}\sim\mathbb{P}_{\hat{x}}}[(\|\nabla_{\hat{x}}D(\hat{x})\|_2 - 1)^2], \quad (11)$$

$$\mathcal{L}_G = -\mathop{\mathbb{E}}_{\tilde{x}\sim\mathbb{P}_g}[D(\tilde{x})] \quad (12)$$

where G represents the network included in the system 200. D is a discriminator network introduced for training G, and its goal is to distinguish the output of network G from the real image. The networks G and D may be trained alternately, so that the network D cannot distinguish the output of the network G (i.e., the training output image) from the real image. $\tilde{x}\sim\mathbb{P}_g$ indicates that $\tilde{x}$ is the output image of the network G (i.e., the training output image) and the distribution of $\tilde{x}$ is $\mathbb{P}_g$. $D(\tilde{x})$ indicates a probability that $\tilde{x}$ determined by the network D is a real image. Therefore, the item $$\mathop{\mathbb{E}}_{\tilde{x}\sim\mathbb{P}_g}[D(\tilde{x})]$$

included in both Equation (11) and Equation (12) represents an expectation that the training output image determined by the network D is a real image. $\tilde{x}\sim\mathbb{P}_r$ indicates that x is a real image and the distribution of x is $\mathbb{P}_r$. D(x) indicates the probability that x determined by the network D is a real image. Therefore, the item $$\mathop{\mathbb{E}}_{x\sim\mathbb{P}_r}[D(x)]$$

in Equation (11) represents an expectation that x determined by network D is a real image. The item $$\lambda \mathop{\mathbb{E}}_{\hat{x}\sim\mathbb{P}_{\hat{x}}}[(\|\nabla_{\hat{x}}D(\hat{x})\|_2 - 1)^2]$$

in Equation (11) represents penalization of gradient, wherein distribution $\mathbb{P}_{\hat{x}}$ is determined based on distribution $\mathbb{P}_r$ and $\mathbb{P}_g$. $\hat{x}\sim\mathbb{P}_{\hat{x}}$ indicates that $\hat{x}$ is an image that obeys the distribution $\mathbb{P}_{\hat{x}}$, and $\nabla_{\hat{x}}D(\hat{x})$ represents the gradient of the network D at $\hat{x}$.

The adversarial training loss function requires that the output image is consistent with the input image in distribution, so that a clearer and more realistic texture may be generated. Therefore, the adversarial training loss function may make the visual effect of the output image realistic enough.

The perceptual loss function is a special "reconstruction loss" applied in a feature space of a specific pre-trained network. The perceptual loss function helps to generate clearer and more realistic textures. In some implementations, the perceptual loss function may include two parts as shown in the following equation:

$$\mathcal{L}_{per} = \frac{1}{C_iH_iW_i}\|\phi_i^{vgg}(I^{SR}) - \phi_i^{vgg}(I^{HR})\|_2^2 + \frac{1}{C_jH_jW_j}\|\phi_j^{lte}(I^{SR}) - T\|_2^2, \quad (13)$$

The first part of the perceptual loss function shown in Equation (13) is a traditional perceptual loss, wherein $\phi_i^{vgg}(\cdot)$ represents the feature map of the $i^{th}$ layer of VGG19, ($C_i$, $H_i$, $W_i$) represents the shape of the feature map of the layer, $I^{SR}$ represents the training output image, and $I^{HR}$ represents the ground truth image.

The second part of the perceptual loss function shown in Equation (13) is a transfer perceptual loss, which is designed for a texture feature extraction task. $\phi_j^{lte}(\cdot)$ represents the texture feature map extracted from the $j^{th}$ layer of the texture extractor (LTE) 301, and ($C_j$, $H_j$, $W_j$) represents the shape of the layer. T represents the transferred feature map 314 shown in FIG. 3.

Specifically, in the training process, the training reference image and the training input image may be applied to the texture extractor 301 to generate the transferred feature map T during training. The obtained training output image may be applied to the $j^{th}$ layer of the texture extractor 301 to generate a texture feature map $\phi_j^{lte}(I^{SR})$ of the $j^{th}$ layer. Then, training may be performed in a manner similar to the conventional perceptual loss function.

This transfer perception loss function constrains the output image to have texture features similar to the transferred texture features. Therefore, the use of the transfer perception loss function may promote more effective transfer of the textures in the reference image.

It should be appreciated that in implementation, one or more of the above-described reconstruction loss function, adversarial training loss function and perceptual loss function may be used according to needs. For example, in an implementation where an output image with better visual quality is expected to be obtained, the adversarial training loss function may be used. In implementations that require a Peak Signal-to-Noise Ratio (PSNR) and a Structural Similarity (SSIM) of the output image, the adversarial training loss function may not be used. In some implementations, only the reconstruction loss function may be used.

Figure 5:
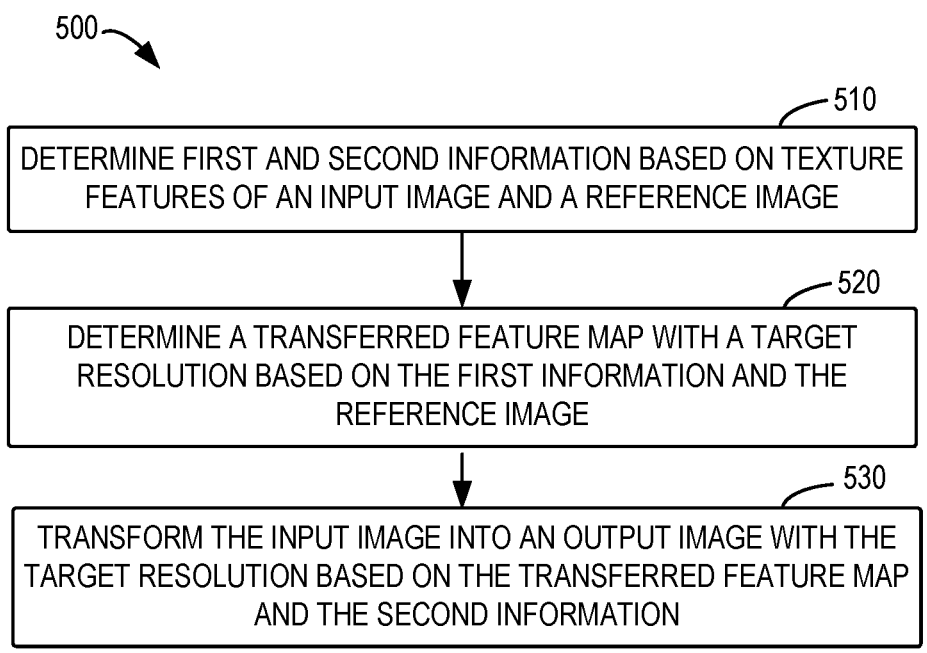
FIG. 5 illustrates a flow chart of a method for image processing according to implementations of the subject matter described herein.

FIG. 5 illustrates a flow chart of a method 500 for image processing according to implementations of the subject matter described herein. The method 500 may be implemented by the computing device 100, for example, may be implemented at the image processing module 122 in the memory 120 of the computing device 100.

As shown in FIG. 5, at block 510, the computing device 100 determines first and second information based on texture features of an input image and a reference image, the first information at least indicating for a first pixel block in the input image a second pixel block in the reference image most relevant to the first pixel block in terms of the texture features, and the second information at least indicating a relevance of the first pixel block to the second pixel block. At block 520, the computing device 100 determines a transferred feature map with a target resolution based on the first information and the reference image. The transferred feature map comprises a feature block corresponding to the first pixel block and the feature block comprises a texture feature of the second pixel block. At block 530, the computing device 100 transforms the input image into an output image with the target resolution based on the transferred feature map and the second information. The output image reflects a texture feature of the reference image.

In some implementations, determining the first and second information comprises: generating a first feature map representing texture features of the input image and a second feature map representing texture features of the reference image by applying the reference image and the input image to a trained first neural network; and determining the first and second information based on the first and second feature maps.

In some implementations, determining the first and second information comprises: for a first feature block in the first feature map corresponding to the first pixel block, determining relevance of the first feature block to a plurality of feature blocks in the second feature map; selecting, from the plurality of feature blocks, a second feature block with the highest relevance to the first feature block; determining the first information based on the first pixel block and the second pixel block in the reference image corresponding to the second feature block; and determining the second information based on the relevance of the second feature block to the first feature block.

In some implementations, applying the reference image and the input image to the first neural network comprises: pre-processing the input image by up-sampling the input image with a predetermined factor; pre-processing the reference image by sequentially down-sampling and up-sampling the reference image with the predetermined factor; and applying the preprocessed input image and reference image to the first neural network.

In some implementations, transforming the input image into the output image comprises: obtaining a first synthesized feature map for the input image, the first synthesized feature map having a first resolution lower than the target resolution, and the first synthesized feature map comprising an image feature of the input image and a texture feature transferred from the reference image; transforming the first synthesized feature map to the target resolution; generating a second synthesized feature map for the input image based on the second information, the transferred feature map and the transformed first synthesized feature map, the second synthesized feature map having the target resolution; and determining the output image based on the second synthesized feature map.

In some implementations, determining the output image based on the second synthesized feature map comprises: combining the second synthesized feature map and the transformed first synthesized feature map into a third synthesized feature map with the target resolution; transforming the second synthesized feature map to the first resolution; combining the first synthesized feature map and the transformed second synthesized feature map into a fourth synthesized feature map with the first resolution; and determining the output image based on the third and fourth synthesized feature map.

In some implementations, the input image has a second resolution lower than the first resolution, and obtaining the first synthesized feature map comprises: extracting the image feature of the input image by using a second neural network; generating a fifth synthesized feature map for the input image based on the first information, the second information and the image feature, the fifth synthesized feature map having a second resolution and comprising a texture feature transferred from the reference image; transforming the fifth synthesized feature map to the first resolution; and determining the first synthesized feature map based on the transformed fifth synthesized feature map.

In some implementations, the method 500 may further include: determining a training transferred feature map based on a training reference image, a training input image, and the first neural network; generating a third feature map representing a texture feature of a training output image by applying the training output image with the target resolution to the first neural network; and training the first neural network by minimizing a difference between the training transferred feature map and the third feature map.

It can be seen from the above depictions that the image processing solution implemented according to the subject matter described herein can make the search and transfer of texture features more accurate, thereby reducing texture blur and texture distortion. In addition, feature integration across different resolution scales is used to enhance a feature expression capability to promote the generation of more realistic images.

Some example implementations of the subject matter described herein are listed below.

In one aspect, the subject matter described herein provides a computer-implemented method. The method comprises: determining first and second information based on texture features of an input image and a reference image, the first information at least indicating for a first pixel block in the input image a second pixel block in the reference image most relevant to the first pixel block in terms of the texture features, and the second information at least indicating relevance of the first pixel block to the second pixel block; determining a transferred feature map with a target resolution based on the first information and the reference image, the transferred feature map comprising a feature block corresponding to the first pixel block and the feature block comprising a texture feature of the second pixel block; and transforming the input image into an output image with the target resolution based on the transferred feature map and the second information, the output image reflecting a texture feature of the reference image.

In some implementations, determining the first and second information comprises: generating a first feature map representing texture features of the input image and a second feature map representing texture features of the reference image by applying the reference image and the input image to a trained first neural network; and determining the first and second information based on the first and second feature maps.

In some implementations, determining the first and second information comprises: for a first feature block in the first feature map corresponding to the first pixel block, determining relevance of the first feature block to a plurality of feature blocks in the second feature map; selecting, from the plurality of feature blocks, a second feature block with the highest relevance to the first feature block; determining the first information based on the first pixel block and the second pixel block in the reference image corresponding to the second feature block; and determining the second information based on the relevance of the second feature block to the first feature block.

In some implementations, applying the reference image and the input image to the first neural network comprises: pre-processing the input image by up-sampling the input image with a predetermined factor; pre-processing the reference image by sequentially down-sampling and up-sampling the reference image with the predetermined factor; and applying the preprocessed input image and reference image to the first neural network.

In some implementations, transforming the input image into the output image comprises: obtaining a first synthesized feature map for the input image, the first synthesized feature map having a first resolution lower than the target resolution, and the first synthesized feature map comprising an image feature of the input image and a texture feature transferred from the reference image; transforming the first synthesized feature map to the target resolution; generating a second synthesized feature map for the input image based on the second information, the transferred feature map and the transformed first synthesized feature map, the second synthesized feature map having the target resolution; and determining the output image based on the second synthesized feature map.

In some implementations, determining the output image based on the second synthesized feature map comprises: combining the second synthesized feature map and the transformed first synthesized feature map into a third synthesized feature map with the target resolution; transforming the second synthesized feature map to the first resolution; combining the first synthesized feature map and the transformed second synthesized feature map into a fourth synthesized feature map with the first resolution; and determining the output image based on the third and fourth synthesized feature maps.

In some implementations, the input image has a second resolution lower than the first resolution, and obtaining the first synthesized feature map comprises: extracting the image feature of the input image by using a second neural network; generating a fifth synthesized feature map for the input image based on the first information, the second information and the image feature, the fifth synthesized feature map having a second resolution and comprising a texture feature transferred from the reference image; transforming the fifth synthesized feature map to the first resolution; and determining the first synthesized feature map based on the transformed fifth synthesized feature map.

In some implementations, the second neural network comprises a residual network.

In a further aspect, the subject matter described herein provides an electronic device. The electronic device comprises: a processing unit; and a memory coupled to the processing unit and comprising instructions stored thereon which, when executed by the processing unit, cause the device to perform acts comprising: determining first and second information based on texture features of an input image and a reference image, the first information at least indicating for a first pixel block in the input image a second pixel block in the reference image most relevant to the first pixel block in terms of the texture features, and the second information at least indicating relevance of the first pixel block to the second pixel block; determining a transferred feature map with a target resolution based on the first information and the reference image, the transferred feature map comprising a feature block corresponding to the first pixel block and the feature block comprising a texture feature of the second pixel block; and transforming the input image into an output image with the target resolution based on the transferred feature map and the second information, the output image reflecting a texture feature of the reference image.

In some implementations, determining the first and second information comprises: generating a first feature map representing texture features of the input image and a second feature map representing texture features of the reference image by applying the reference image and the input image to a trained first neural network; and determining the first and second information based on the first and second feature maps.

In some implementations, determining the first and second information comprises: for a first feature block in the first feature map corresponding to the first pixel block, determining relevance of the first feature block to a plurality of feature blocks in the second feature map; selecting, from the plurality of feature blocks, a second feature block with the highest relevance to the first feature block; determining the first information based on the first pixel block and the second pixel block in the reference image corresponding to the second feature block; and determining the second information based on the relevance of the second feature block to the first feature block.

In some implementations, applying the reference image and the input image to the first neural network comprises: pre-processing the input image by up-sampling the input image with a predetermined factor; pre-processing the reference image by sequentially down-sampling and up-sampling the reference image with the predetermined factor; and applying the preprocessed input image and reference image to the first neural network.

In some implementations, transforming the input image into the output image comprises: obtaining a first synthesized feature map for the input image, the first synthesized feature map having a first resolution lower than the target resolution, and the first synthesized feature map comprising an image feature of the input image and a texture feature transferred from the reference image; transforming the first synthesized feature map to the target resolution; generating a second synthesized feature map for the input image based on the second information, the transferred feature map and the transformed first synthesized feature map, the second synthesized feature map having the target resolution; and determining the output image based on the second synthesized feature map.

In some implementations, determining the output image based on the second synthesized feature map comprises: combining the second synthesized feature map and the transformed first synthesized feature map into a third synthesized feature map with the target resolution; transforming the second synthesized feature map to the first resolution; combining the first synthesized feature map and the transformed second synthesized feature map into a fourth synthesized feature map with the first resolution; and determining the output image based on the third and fourth synthesized feature maps.

In some implementations, the input image has a second resolution lower than the first resolution, and obtaining the first synthesized feature map comprises: extracting the image feature of the input image by using a second neural network; generating a fifth synthesized feature map for the input image based on the first information, the second information and the image feature, the fifth synthesized feature map having a second resolution and comprising a texture feature transferred from the reference image; transforming the fifth synthesized feature map to the first resolution; and determining the first synthesized feature map based on the transformed fifth synthesized feature map.

In some implementations, the method further comprises determining a training transferred feature map based on a training reference image, a training input image, and the first neural network; generating a third feature map representing a texture feature of a training output image by applying the training output image with the target resolution to the first neural network; and training the first neural network by minimizing a difference between the training transferred feature map and the third feature map.

In a further aspect, the subject matter described herein provides a computer program product being tangibly stored in a non-transitory computer storage medium and comprising machine-executable instructions which, when executed by a device, causing the device to perform the method of the above aspect.

In another aspect, the subject matter described herein provides a computer-readable medium having machine-executable instructions stored thereon which, when executed by a device, cause the device to perform the method of the above aspect.

The functionality described herein can be performed, at least in part, by one or more hardware logic components. For example, and without limitation, illustrative types of hardware logic components that can be used include Field-Programmable Gate Arrays (FPGAs), Application-specific Integrated Circuits (ASICs), Application-specific Standard Products (ASSPs), System-on-a-chip systems (SOCs), Complex Programmable Logic Devices (CPLDs), and the like.

Program code for carrying out methods of the subject matter described herein may be written in any combination of one or more programming languages. These program codes may be provided to a processor or controller of a general purpose computer, a special purpose computer, or other programmable data processing apparatus, such that the program codes, when executed by the processor or controller, cause the functions/operations specified in the flowcharts and/or block diagrams to be implemented. The program code may execute entirely on a machine, partly on the machine, as a stand-alone software package, partly on the machine and partly on a remote machine or entirely on the remote machine or a server.

In the context of this subject matter described herein, a machine-readable medium may be any tangible medium that may contain, or store a program for use by or in connection with an instruction execution system, apparatus, or device. The machine-readable medium may be a machine-readable signal medium or a machine-readable storage medium. A machine-readable medium may include, but is not limited to, an electronic, magnetic, optical, electromagnetic, infrared, or semiconductor system, apparatus, or device, or any suitable combination of the foregoing. More specific examples of the machine-readable storage medium would include an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing.

Further, although operations are depicted in a particular order, it should be understood that the operations are required to be executed in the particular order shown or in a sequential order, or all operations shown are required to be executed to achieve the expected results. In certain circumstances, multitasking and parallel processing may be advantageous. Likewise, while several specific implementation details are contained in the above discussions, these should not be construed as limitations on the scope of the subject matter described herein. Certain features that are described in the context of separate implementations may also be implemented in combination in a single implementation. Conversely, various features that are described in the context of a single implementation may also be implemented in multiple implementations separately or in any suitable subcombination.

Although the subject matter has been described in language specific to structural features and/or methodological acts, it is to be understood that the subject matter specified in the appended claims is not necessarily limited to the specific features or acts described above. Rather, the specific features and acts described above are disclosed as example forms of implementing the claims.

The invention claimed is:

1. A computer-implemented method, comprising:
determining first and second information based on texture features of an input image and a reference image, the first information at least indicating for a first pixel block in the input image a second pixel block in the reference image most relevant to the first pixel block in terms of the texture features, and the second information at least indicating relevance of the first pixel block to the second pixel block;
determining a transferred feature map with a target resolution based on the first information and the reference image, the transferred feature map comprising a feature block corresponding to the first pixel block and the feature block comprising a texture feature of the second pixel block; and
transforming the input image into an output image with the target resolution based on the transferred feature map and the second information, the output image reflecting a texture feature of the reference image, wherein transforming the input image into the output image comprises:
obtaining a first synthesized feature map for the input image, the first synthesized feature map having a first resolution lower than the target resolution, and the first synthesized feature map comprising an image feature of the input image and a texture feature transferred from the reference image;
transforming the first synthesized feature map to the target resolution;
generating a second synthesized feature map for the input image based on the second information, the transferred feature map and the transformed first synthesized feature map, the second synthesized feature map having the target resolution; and
determining the output image based on the second synthesized feature map.

2. The method of claim 1, wherein determining the first and second information comprises:
  generating a first feature map representing texture features of the input image and a second feature map representing texture features of the reference image by applying the reference image and the input image to a trained first neural network; and
  determining the first and second information based on the first and second feature maps.

3. The method of claim 2, wherein determining the first and second information comprises:
  for a first feature block in the first feature map corresponding to the first pixel block, determining relevance of the first feature block to a plurality of feature blocks in the second feature map;
  selecting, from the plurality of feature blocks, a second feature block with the highest relevance to the first feature block;
  determining the first information based on the first pixel block and the second pixel block in the reference image corresponding to the second feature block; and
  determining the second information based on the relevance of the second feature block to the first feature block.

4. The method of claim 2, wherein applying the reference image and the input image to the first neural network comprises:
  pre-processing the input image by up-sampling the input image with a predetermined factor;
  pre-processing the reference image by sequentially down-sampling and up-sampling the reference image with the predetermined factor; and
  applying the preprocessed input image and reference image to the first neural network.

5. The method of claim 1, wherein determining the output image based on the second synthesized feature map comprises:
  combining the second synthesized feature map and the transformed first synthesized feature map into a third synthesized feature map with the target resolution;
  transforming the second synthesized feature map to the first resolution;
  combining the first synthesized feature map and the transformed second synthesized feature map into a fourth synthesized feature map with the first resolution; and
  determining the output image based on the third and fourth synthesized feature maps.

6. The method of claim 1, wherein the input image has a second resolution lower than the first resolution, and obtaining the first synthesized feature map comprises:
  extracting the image feature of the input image by using a second neural network;
  generating a fifth synthesized feature map for the input image based on the first information, the second information and the image feature, the fifth synthesized feature map having a second resolution and comprising a texture feature transferred from the reference image;
  transforming the fifth synthesized feature map to the first resolution; and
  determining the first synthesized feature map based on the transformed fifth synthesized feature map.

7. The method of claim 2, further comprising:
  determining a training transferred feature map based on a training reference image, a training input image, and the first neural network;
  generating a third feature map representing a texture feature of a training output image by applying the training output image with the target resolution to the first neural network; and
  training the first neural network by minimizing a difference between the training transferred feature map and the third feature map.

8. An electronic device, comprising:
  a processing unit; and
  a memory coupled to the processing unit and comprising instructions stored thereon which, when executed by the processing unit, cause the device to perform acts comprising:
  determining first and second information based on texture features of an input image and a reference image, the first information at least indicating for a first pixel block in the input image a second pixel block in the reference image most relevant to the first pixel block in terms of the texture features, and the second information at least indicating relevance of the first pixel block to the second pixel block;
  determining a transferred feature map with a target resolution based on the first information and the reference image, the transferred feature map comprising a feature block corresponding to the first pixel block and the feature block comprising a texture feature of the second pixel block; and
  transforming the input image into an output image with the target resolution based on the transferred feature map and the second information, the output image reflecting a texture feature of the reference image, wherein transforming the input image into the output image comprises:
    obtaining a first synthesized feature map for the input image, the first synthesized feature map having a first resolution lower than the target resolution, and the first synthesized feature map comprising an image feature of the input image and a texture feature transferred from the reference image;
    transforming the first synthesized feature map to the target resolution;
    generating a second synthesized feature map for the input image based on the second information, the transferred feature map and the transformed first synthesized feature map, the second synthesized feature map having the target resolution; and
    determining the output image based on the second synthesized feature map.

9. The device of claim 8, wherein determining the first and second information comprises:
  generating a first feature map representing texture features of the input image and a second feature map representing texture features of the reference image by applying the reference image and the input image to a trained first neural network; and
  determining the first and second information based on the first and second feature maps.

10. The device of claim 9, wherein determining the first and second information comprises:
  for a first feature block in the first feature map corresponding to the first pixel block, determining relevance of the first feature block to a plurality of feature blocks in the second feature map;
  selecting, from the plurality of feature blocks, a second feature block with the highest relevance to the first feature block;

determining the first information based on the first pixel block and the second pixel block in the reference image corresponding to the second feature block; and determining the second information based on the relevance of the second feature block to the first feature block.

11. The device of claim 9, wherein applying the reference image and the input image to the first neural network comprises:

pre-processing the input image by up-sampling the input image with a predetermined factor;

pre-processing the reference image by sequentially down-sampling and up-sampling the reference image with the predetermined factor; and applying the preprocessed input image and reference image to the first neural network.

12. The device of claim 8, wherein determining the output image based on the second synthesized feature map comprises:

combining the second synthesized feature map and the transformed first synthesized feature map into a third synthesized feature map with the target resolution;

transforming the second synthesized feature map to the first resolution;

combining the first synthesized feature map and the transformed second synthesized feature map into a fourth synthesized feature map with the first resolution; and determining the output image based on the third and fourth synthesized feature maps.

13. A non-transitory machine-readable medium having instructions stored therein, which when executed by a processor, cause the processor to perform operations for:

determining first and second information based on texture features of an input image and a reference image, the first information at least indicating for a first pixel block in the input image a second pixel block in the reference image most relevant to the first pixel block in terms of the texture features, and the second information at least indicating relevance of the first pixel block to the second pixel block;

determining a transferred feature map with a target resolution based on the first information and the reference image, the transferred feature map comprising a feature block corresponding to the first pixel block and the feature block comprising a texture feature of the second pixel block; and transforming the input image into an output image with the target resolution based on the transferred feature map and the second information, the output image reflecting a texture feature of the reference image, wherein transforming the input image into the output image comprises:

obtaining a first synthesized feature map for the input image, the first synthesized feature map having a first resolution lower than the target resolution, and the first synthesized feature map comprising an image feature of the input image and a texture feature transferred from the reference image;

transforming the first synthesized feature map to the target resolution;

generating a second synthesized feature map for the input image based on the second information, the transferred feature map and the transformed first synthesized feature map, the second synthesized feature map having the target resolution; and determining the output image based on the second synthesized feature map.

\* \* \* \* \*